(12) United States Patent
Nakada et al.

(10) Patent No.: US 12,115,975 B2
(45) Date of Patent: Oct. 15, 2024

(54) PARKING SUPPORT SYSTEM AND CONTROL METHOD THEREOF

(71) Applicant: HONDA MOTOR CO., LTD., Tokyo (JP)

(72) Inventors: Yuki Nakada, Wako (JP); Yuki Hara, Wako (JP); Yasushi Shoda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 139 days.

(21) Appl. No.: 17/113,241

(22) Filed: Dec. 7, 2020

(65) Prior Publication Data

US 2021/0179085 A1    Jun. 17, 2021

(30) Foreign Application Priority Data

Dec. 13, 2019 (JP) ................................ 2019-225728

(51) Int. Cl.
*B60W 30/06* (2006.01)
*B60W 10/18* (2012.01)
(Continued)

(52) U.S. Cl.
CPC .......... *B60W 30/06* (2013.01); *B60W 10/182* (2013.01); *B60W 10/196* (2013.01);
(Continued)

(58) Field of Classification Search
CPC .. B60W 30/06; B60W 10/182; B60W 10/196; B60W 50/14; B60W 2710/186; B60W 2710/188
See application file for complete search history.

(56) References Cited

U.S. PATENT DOCUMENTS

| 10,024,431 B2 | 7/2018 | Parker, Jr. et al. |
| 10,358,120 B2 | 7/2019 | Takase et al. |

(Continued)

FOREIGN PATENT DOCUMENTS

| CN | 105473907 A | 4/2016 |
| CN | 107031585 A | 8/2017 |

(Continued)

OTHER PUBLICATIONS

Japanese Office Action for Japanese Patent Application No. 2019-225728 mailed Aug. 6, 2021 (partially translated).

(Continued)

*Primary Examiner* — Jelani A Smith
*Assistant Examiner* — Toya Pettiegrew
(74) *Attorney, Agent, or Firm* — Thomas | Horstemeyer, LLP

(57) ABSTRACT

A parking support system of a vehicle, comprises: a detection unit configured to detect information of a periphery of the vehicle; a control unit configured to control, based on the information detected by the detection unit, a parking space entry operation of the vehicle to a parking space and a parking space exit operation of the vehicle from the parking space; and a stationary state control unit configured to maintain a stationary state of the vehicle after one of the parking space entry operation and the parking space exit operation has been completed. The stationary state control unit maintains the stationary state by first maintenance control when the parking space entry operation has been completed and maintains the stationary state by second maintenance control, which is different from the first maintenance control when the parking space exit operation has been completed.

10 Claims, 7 Drawing Sheets

(51) Int. Cl.
   *B60W 10/196*   (2012.01)
   *B60W 50/14*   (2020.01)
(52) U.S. Cl.
   CPC ....... *B60W 50/14* (2013.01); *B60W 2050/146* (2013.01); *B60W 2510/18* (2013.01); *B60W 2710/186* (2013.01); *B60W 2710/188* (2013.01)

(56) References Cited

U.S. PATENT DOCUMENTS

| | | | |
|---|---|---|---|
| 2016/0186859 A1 | 6/2016 | Parker, Jr. et al. | |
| 2017/0021828 A1* | 1/2017 | Seo | B60W 10/10 |
| 2017/0137008 A1 | 5/2017 | Takase et al. | |
| 2018/0244312 A1 | 8/2018 | Kato et al. | |
| 2019/0375381 A1* | 12/2019 | Nakagawa | B60K 35/00 |
| 2020/0001864 A1* | 1/2020 | Oyama | B60W 10/18 |
| 2020/0055493 A1* | 2/2020 | Baehrle-Miller | B60T 7/122 |
| 2020/0223404 A1* | 7/2020 | Asano | B60T 7/12 |
| 2021/0023994 A1* | 1/2021 | Watanabe | G06T 19/20 |

FOREIGN PATENT DOCUMENTS

| | | |
|---|---|---|
| JP | 2012-056428 A | 3/2012 |
| JP | 6257718 B1 | 1/2018 |
| JP | 2018-140757 A | 9/2018 |
| JP | 2019-014381 A | 1/2019 |
| JP | 2019-139331 A | 8/2019 |
| JP | 2019-139696 A | 8/2019 |

OTHER PUBLICATIONS

Chinese Office Action for Chinese Patent Application No. 202011381784.9 mailed Aug. 18, 2023.

* cited by examiner

PARKING SUPPORT SYSTEM AND CONTROL METHOD THEREOF

CROSS-REFERENCE TO RELATED APPLICATION(S)

This application claims priority to and the benefit of Japanese Patent Application No. 2019-225728 filed on Dec. 13, 2019, the entire disclosure of which is incorporated herein by reference.

BACKGROUND OF THE INVENTION

Field of the Invention

The present invention relates to a parking support system and a control method thereof, and more specifically, a vehicle control technique.

Description of the Related Art

Parking support control is known as a control operation of automated driving of a vehicle. Japanese Patent Laid-Open No. 2018-140757 discloses that the steering and a vehicle speed of the vehicle are controlled when the vehicle is to be parked in or is to exit from a parking space.

Japanese Patent Laid-Open No. 2018-140757 discloses that a driver can perform a brake operation, after the vehicle has been parked by parking support control of a system, to end the continuation of the stationary state of the vehicle set by the system. However, Japanese Patent Laid-Open No. 2018-140757 does not disclose the details of a method for maintaining the stationary state of the vehicle when the vehicle has completed exiting or entering a parking space.

Hence, the present invention provides a vehicle control technique that can hand over the control subject from the side of the system to the side of the driver in a case in which the control subject is switched from the side of the system to the side of the driver when parking support control has been completed.

SUMMARY OF THE INVENTION

According to one aspect of the present invention, there is provided a parking support system of a vehicle, comprising:
a detection unit configured to detect information of a periphery of the vehicle;
a control unit configured to control, based on the information detected by the detection unit, a parking space entry operation of the vehicle to a parking space and a parking space exit operation of the vehicle from the parking space; and
a stationary state control unit configured to maintain a stationary state of the vehicle after one of the parking space entry operation and the parking space exit operation has been completed,
wherein the stationary state control unit maintains the stationary state by first maintenance control when the parking space entry operation has been completed, and maintains the stationary state by second maintenance control, which is different from the first maintenance control, when the parking space exit operation has been completed.

According to another aspect of the present invention, there is provided a control method of parking support system of a vehicle, the method comprising:
a detection step of detecting information of a periphery of the vehicle;
a control step of controlling, based on the information detected in the detection step, a parking space entry operation of the vehicle to a parking space and a parking space exit operation of the vehicle from the parking space; and
a stationary state control step of maintaining a stationary state of the vehicle after one of the parking space entry operation and the parking space exit operation has been completed,
wherein in the stationary state control step, the stationary state is maintained by first maintenance control when the parking space entry operation has been completed, and the stationary state is maintained by second maintenance control, which is different from the first maintenance control, when the parking space exit operation has been completed.

According to the present invention, in a case in which the control subject is to be switched from the side of a system to the side of a driver upon completion of parking support control, the control subject can be appropriately handed over from side of the system to the side of the driver.

DESCRIPTION OF THE EMBODIMENTS

Figure 1:
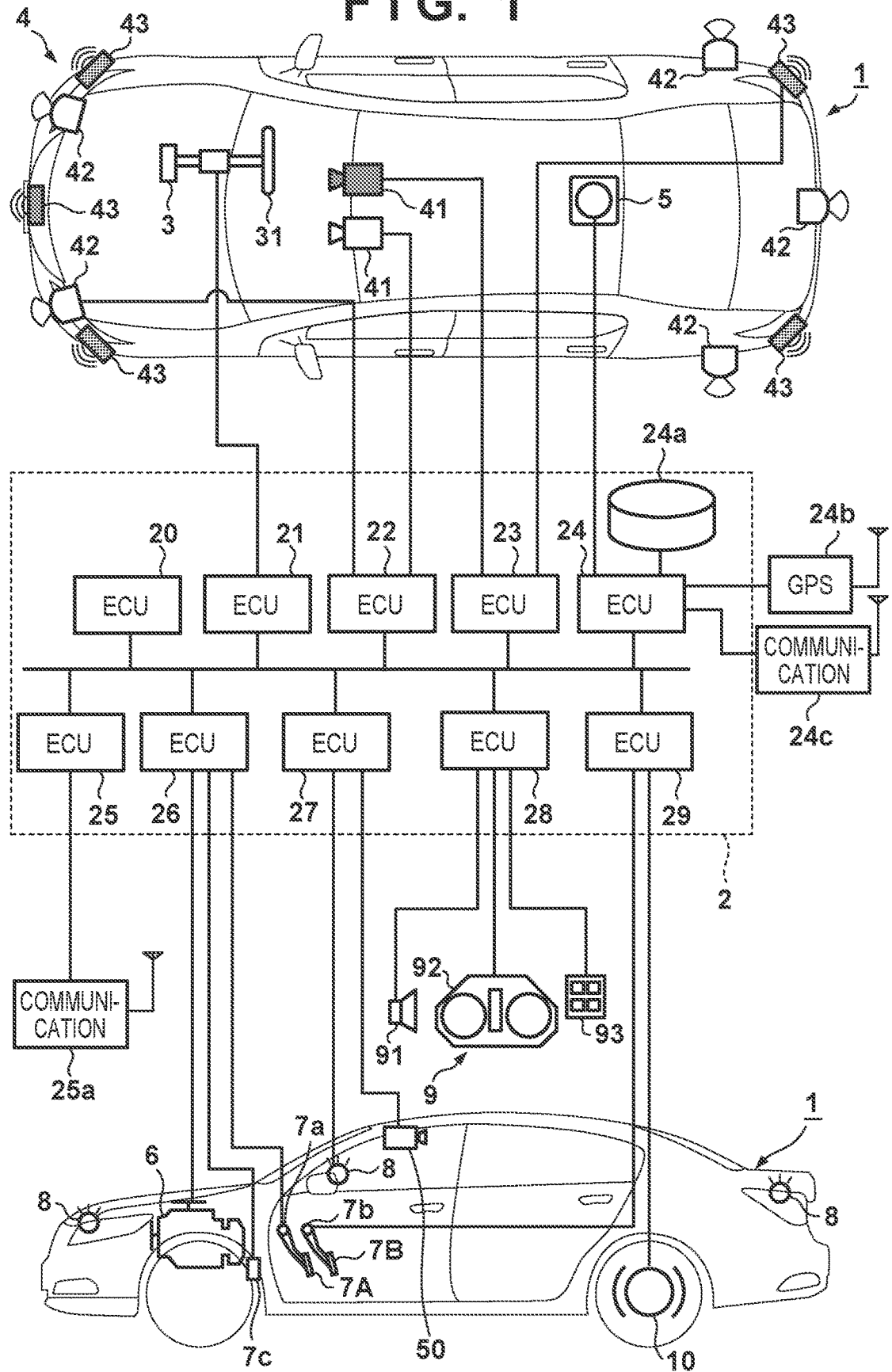
FIG. 1 is a block diagram showing a vehicle control apparatus according to an embodiment of the present invention.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

First Embodiment

[Vehicle Arrangement]

FIG. 1 is a block diagram of a vehicle control apparatus according to an embodiment of the present invention and controls a vehicle 1. FIG. 1 shows the outline of the vehicle 1 by a plan view and a side view. The vehicle 1 is, for example, a sedan-type four-wheeled vehicle.

A vehicle control apparatus of FIG. 1 includes a control system 2. The control system 2 includes a plurality of ECUs 20 to 29 communicably connected by an in-vehicle network, Each ECU includes a processor represented by a CPU, a storage device such as a semiconductor memory, an interface with an external device, and the like. The storage device stores programs to be executed by the processor, data to be used by the processor for processing, and the like. Each ECU may include a plurality of processors, storage devices, and interfaces.

The functions and the like provided by the ECUs 20 to 29 will be described below, Note that the number of ECUs and the provided functions can be appropriately designed, and they can be subdivided or integrated as compared to this embodiment.

The ECU 20 executes control associated with automated driving of the vehicle 1. In automated driving, at least one of steering and acceleration/deceleration of the vehicle I is automatically controlled. Both steering and acceleration/deceleration are automatically controlled in the control example to be described later.

The ECU 21 controls an electric power steering device 3. The electric power steering device 3 includes a mechanism that steers front wheels in accordance with a driving operation (steering operation) of a driver on a steering wheel 31. In addition, the electric power steering device 3 includes a motor that generates a driving force to assist the steering operation or automatically steer the front wheels, and a sensor that detects the steering angle. If the driving state of the vehicle 1 is automated driving, the ECU 21 automatically controls the electric power steering device 3 in correspondence with an instruction from the ECU 20 and controls the direction of travel of the vehicle 1. In addition, the ECU 21 performs control to maintain the steering angle when the vehicle 1 is stationary or when an operation subject is being switched.

The ECUs 22 and 23 perform control of detection units 41 to 43 that detect the peripheral state of the vehicle and information processing of detection results. Each detection unit 41 is a camera (to be sometimes referred to as the camera 41 hereinafter) that captures the front side of the vehicle 1. In this embodiment, the cameras 41 are attached to the windshield inside the vehicle cabin at the front of the roof of the vehicle 1. When images captured by the cameras 41 are analyzed, the contour of a target or a division line (a white line or the like) of a lane on a road can be extracted.

The detection unit 42 is Light Detection and Ranging (LiDAR) (to be sometimes referred to as the LiDAR 42 hereinafter), and detects a target around the vehicle 1 or measures the distance to a target. In this embodiment, five LiDARs 42 are provided; one at each corner of the front portion of the vehicle 1, one at the center of the rear portion, and one on each side of the rear portion. The detection unit 43 is a millimeter wave radar (to be sometimes referred to as the radar 43 hereinafter), and detects a target around the vehicle 1 or measures the distance to a target. In this embodiment, five radars 43 are provided; one at the center of the front portion of the vehicle 1, one at each corner of the front portion, and one at each corner of the rear portion. Furthermore, although not shown in FIG. 1, the vehicle 1 can include, together with the detection units 43, sonars which use acoustic waves. The sonars are installed in a plurality of positions for detecting a target object present in each of the front, rear, and lateral positions of the vehicle 1, and can be used in the parking support control to be described later.

The ECU 22 performs control of one camera 41 and each LiDAR 42 and information processing of detection results. The ECU 23 performs control of the other camera 41 and each radar 43 and information processing of detection results. The ECUs 22 and 23 generate images of the periphery based on image data captured by the cameras 41. Images of the periphery can be, for example, a top view corresponding to a planar view of the vehicle and its periphery, a bird's-eye view corresponding to a three-dimensional image in which the vehicle and the periphery in the direction of travel of the vehicle are seen from above, and the like. Since two sets of devices that detect the peripheral state of the vehicle are provided, the reliability of detection results can be improved. In addition, since detection units of different types such as cameras, LIDARs, radars, and sonars are provided, the peripheral environment of the vehicle can be analyzed multilaterally.

The ECU 24 performs control of a gyro sensor 5, a GPS sensor 24b, and a communication device 24c and information processing of detection results or communication results. The gyro sensor 5 detects a rotary motion of the vehicle 1. The course of the vehicle 1 can be determined based on the detection result of the gyro sensor 5, the wheel speed, or the like. The GPS sensor 24b detects the current position of the vehicle 1. The communication device 24c performs wireless communication with a server that provides map information and traffic information and acquires these pieces of information. The ECU 24 can access a map information database 24a formed in the storage device. The ECU 24 searches for a route from the current position to the destination.

The ECU 25 includes a communication device 25a for inter-vehicle communication. The communication device 25a performs wireless communication with another vehicle in the periphery and performs information exchange between the vehicles.

The ECU 26 controls a power plant 6. The power plant 6 is a mechanism that outputs a driving force to rotate the driving wheels of the vehicle 1 and includes, for example, an engine and a transmission. The ECU 26, for example, controls the output of the engine in correspondence with a driving operation (accelerator operation or acceleration operation) of the driver detected by an operation detection sensor 7a provided on an accelerator pedal 7A, or switches the gear ratio of the transmission based on information such as a vehicle speed detected by a vehicle speed sensor 7c. The number and the type of gear ratios of the transmission are not particularly limited. For example, the park (P) range, the reverse (R) range, the neutral (N) range, and the drive (D) range are examples of gear shift positions, if the driving state of the vehicle 1 is manual driving, the gear ratio of the transmission is switched by operating a gear shifter (not shown), if the driving state of the vehicle 1 is automated driving, the ECU 26 automatically controls the power plant 6 in correspondence with an instruction from the ECU 20 and controls the acceleration/deceleration of the vehicle 1.

The ECU 27 controls lighting devices (headlights, taillights, and the like) including direction indicators 8 (turn signals). In the example shown in FIG. 1, the direction indicators 8 are provided in the front portion, door mirrors, and the rear portion of the vehicle 1.

The ECU 28 controls an input/output device 9. The input/output device 9 outputs information to the driver and accepts input of information from the driver. A voice output device 91 notifies the driver of the information by voice (words). A display device 92 notifies the driver of information by displaying an image. The display device 92 is arranged, for example, in front of the driver's seat and constitutes an instrument panel or the like. Note that although notification by voice and display have been exemplified here, the driver may be notified of information using a vibration or light. Alternatively, the driver may be notified of information by a combination of some of the voice, display, vibration, and light. Furthermore, the combination or the notification form may be changed in accordance with the level (for example, the degree of urgency) of information of which the driver is to be notified.

An input device 93 is a switch group that is arranged at a position where the driver can perform an operation, is used to issue an instruction to the vehicle 1, and may also include a voice input device. The arrangement of switches forming the input device 93 can be set in accordance with the functions of the vehicle 1. In addition, in this embodiment, a touch panel display that displays various kinds of images generated by the ECUs 22 and 23 is included as the input device 93.

The ECU 29 controls a brake device 10 and a parking brake (not shown). The brake device 10 is, for example, a disc brake device which is provided for each wheel of the vehicle 1 and decelerates or stops the vehicle 1 by applying a resistance to the rotation of the wheel. The ECU 29, for example, controls the operation of the brake device 10 in correspondence with a driving operation (brake operation) of the driver detected by an operation detection sensor 7b provided on a brake pedal 7B. If the driving state of the vehicle 1 is automated driving or driving support, the ECU 29 automatically controls the brake device 10 in correspondence with an instruction from the ECU 20 and controls deceleration and stop of the vehicle The brake device 10 or the parking brake can also be operated to maintain the stationary state of the vehicle 1. In addition, if the transmission of the power plant 6 includes a parking lock mechanism, it can be operated to maintain the stationary state of the vehicle 1. In this embodiment, the stationary state of the vehicle 1 can be maintained by each of or a combination of the brake device 10, the parking brake, and the parking lock mechanism.

The vehicle 1 further includes an in-vehicle detection unit 50 that detects the state inside the vehicle. In this case, the in-vehicle detection unit 50 is formed by a camera as an image capturing unit, a weight sensor, a temperature detection sensor, and the like, and the type of the in-vehicle detection unit is not particularly limited. Note that the in-vehicle detection unit 50 may be arranged for each seat provided in the vehicle I or a single in-vehicle detection unit may be arranged so that the overall state inside the vehicle can be monitored or viewed from above.

[Examples of Control Functions]

The control functions of the vehicle 1 according to this embodiment include traveling-associated functions associated with the control of driving, braking, and steering of the vehicle 1, and notification functions associated with the notification of information to the driver.

Examples of traveling-associated functions are lane maintenance control, lane departure suppression control (road departure suppression control), lane change control, preceding vehicle following control, collision reduction brake control, erroneous start suppression control, and parking support control. Examples of the notification functions are adjacent vehicle notification control and peripheral target object notification control. In addition, the notification function can be executed by voice, an image, or a video or by a combination of voice, an image, and a video.

Parking support control is control performed to specify a path of movement to a designated space (stationary position) and to automatically move the vehicle 1 along this specified path and set the vehicle in a stationary state. In this embodiment, parking space entry control, in which the vehicle is moved from a travel position to a parking position, and parking space exit control, in which the vehicle exits from the parking position to a position that allows travel, will both be described as parking support control.

Adjacent vehicle notification control is control performed to notify the driver of the presence of another vehicle traveling on the adjacent lane which is adjacent to the travel lane of the self-vehicle. The driver is notified of, for example, the presence of another vehicle traveling on a lateral side or on a rear side of the self-vehicle. Peripheral target object notification control is notification control performed when a target object is detected in the periphery of the self-vehicle. In this detection range, a target object which is present in the range of the direction of travel of the self-vehicle and in the range in which the self-vehicle intends to be positioned (intends to move) in accordance with the control contents at that point of time can be set as the notification target. These notifications can be performed by the in-vehicle notification devices described above.

[Maintenance of Stationary State]

The vehicle 1 according to this embodiment switches a plurality of stationary state maintenance control operations to maintain a stationary state. As described above, the vehicle 1 includes, as a mechanism for braking, the brake device 10 and the parking brake. A parking lock mechanism is also included in the transmission included in the power plant 6. The parking lock mechanism is a braking mechanism that can operate when the transmission has been switched to the "park" range, and can provide a constant braking force.

In the parking support control according to this embodiment, the state of a mechanism that is used for stationary state maintenance control is switched between a stationary state which is set at the completion of a parking space entry operation and a stationary state which is set at the completion of a parking space exit operation. More specifically, since it can be assumed that the occupant of the vehicle I will get out of the vehicle When the parking space entry operation has been completed, a stationary state with fewer operations to be performed by the driver toward the end of driving can be set. In this case, the vehicle will be maintained in a stationary state, which is set at the completion of the parking space entry operation, by the braking by the brake device 10 and the parking lock mechanism of the park range. That is, when the vehicle has completed the parking space entry operation, the gear shift position is switched to the park range. Note that the parking brake may be further operated in addition to the above-described operation. This will set the vehicle in a stationary state with fewer operations to be performed by the driver toward the end of driving.

On the other hand, since it can be assumed that the driver of the vehicle 1 will start driving from the position Where the vehicle has completed exiting from the parking space at the completion of the parking space exit operation, the vehicle will be set in a stationary state with fewer operations to be performed by the driver toward the start of driving. In this case, the vehicle will be maintained in a stationary state set at the completion of the parking space exit operation by the braking by the brake device 10. Note that although it will be assumed that the driver will not perform an operation related to steering and braking and such operations will be controlled on the side of the system during the execution of parking support control, it will also be assumed that the driver will perform peripheral monitoring as needed during the execution of the parking support control.

[Display Example]

Figure 2:
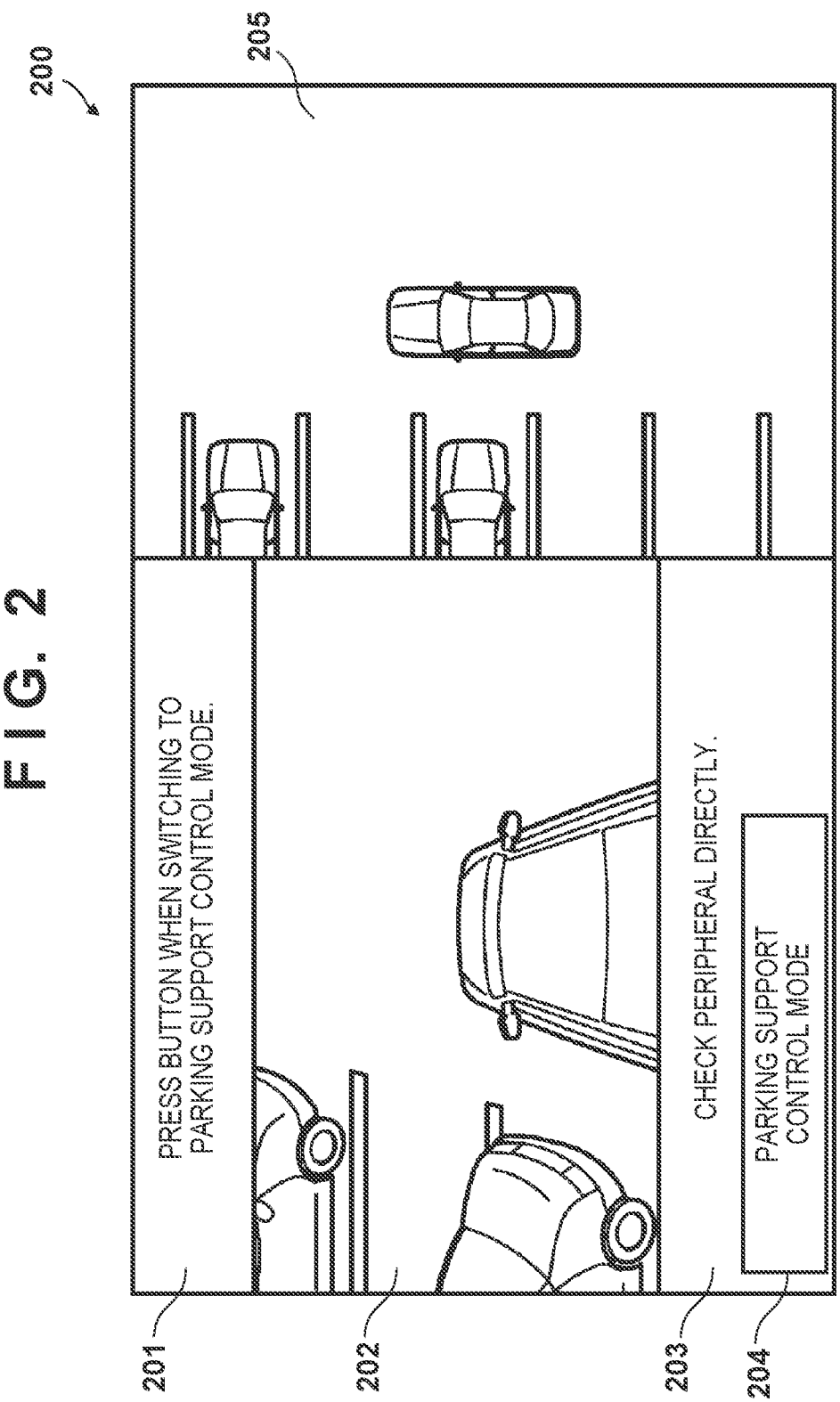
FIG. 2 is a view showing an example of the arrangement of a display screen according to the embodiment of the present invention.

FIG. 2 is an example of the arrangement of a screen which is displayed on the touch panel display included in the input device 93 provided in the vehicle 1 according to this embodiment. In this embodiment, a top view and a bird's-eye view generated by the ECUs 22 and 23 are displayed based on an image captured by the cameras 41.

In a screen 200, a message is displayed in an area 201, A bird's-eye view centered around the vehicle 1 is displayed in an area 202. In the area 202, an image to be displayed can be switched in accordance with the direction of travel (frontwards or backwards). A button for accepting an operation from the user is arranged in addition to a message in an area 203. In this embodiment, a button 204 for executing parking support control is arranged in the area 203. Note that the button 204 for executing the parking support control may also be arranged as one of the switches forming the input device 93 in addition to the touch panel display and the like. A top view centered around the vehicle 1 is displayed in an area 205.

[Parking Space Entry Control]

Figure 3:
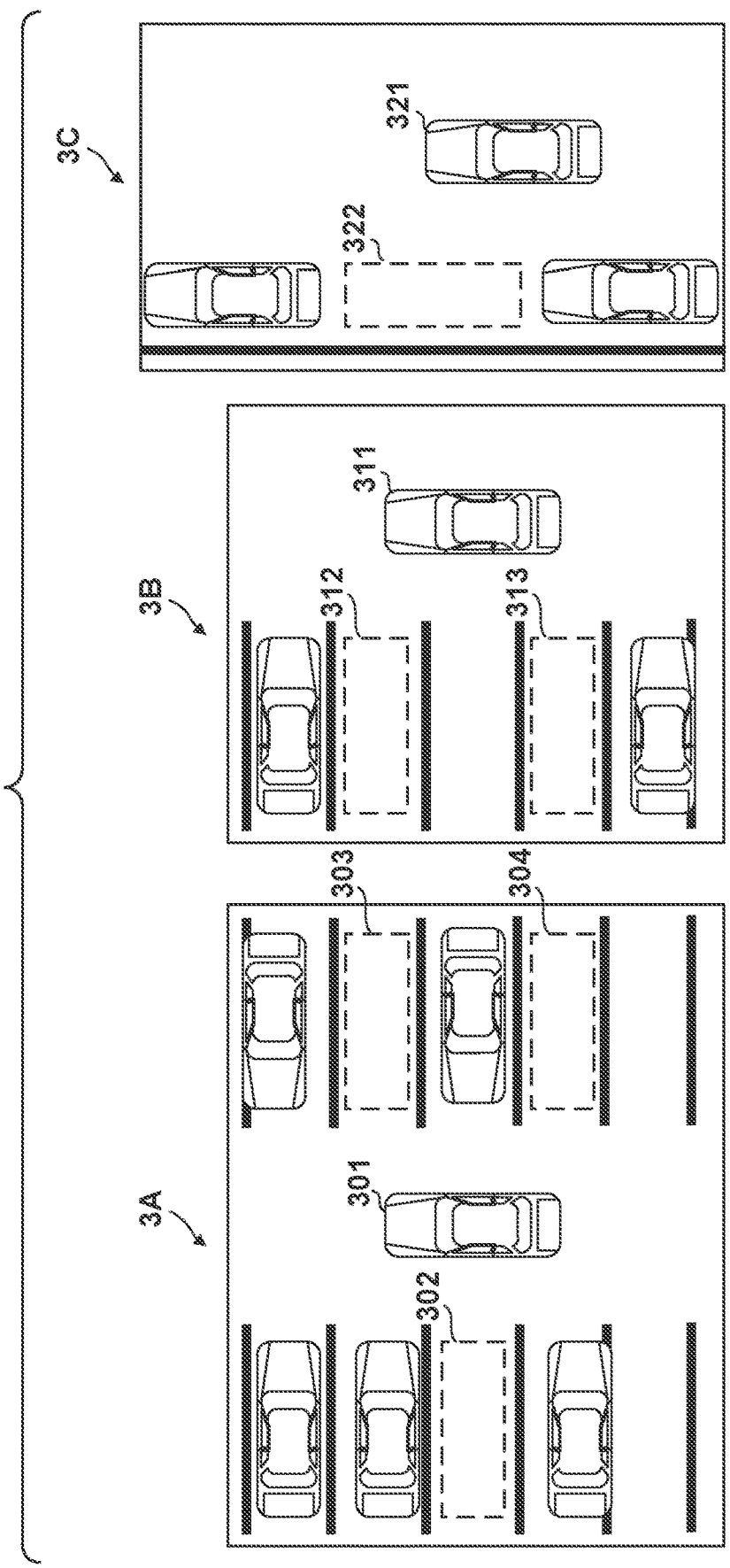
FIG. 3 is a view showing examples of a parking space according to the embodiment of the present invention.

FIG. 3 is a view for explaining parking space entry control of the parking support control according to the embodiment. An example 3A of FIG. 3 shows a state in which available parking spaces 302, 303, and 304 have been detected in the peripheral area based on the detection result by the detection units 41 to 43 when a vehicle 301 is to be parked in a parking lot or the like. An example 3B of FIG. 3 shows a state in which available parking spaces 312 and 313 have been detected in the peripheral area based on the detection result by the detection units 41 to 43 when a vehicle 311 is to be parked. An example 3C of FIG. 3 shows a state in which an available parking space 322 has been detected based on the detection result by the detection units 41 to 43 when a vehicle 321 is to be parallel-parked. Although an available parking space is detected based on the specifications (the size and the maneuverability) and the like of the self-vehicle in addition to the detection result obtained by the detection units, a known method can be used to detect the available parking spaces.

Figure 4:
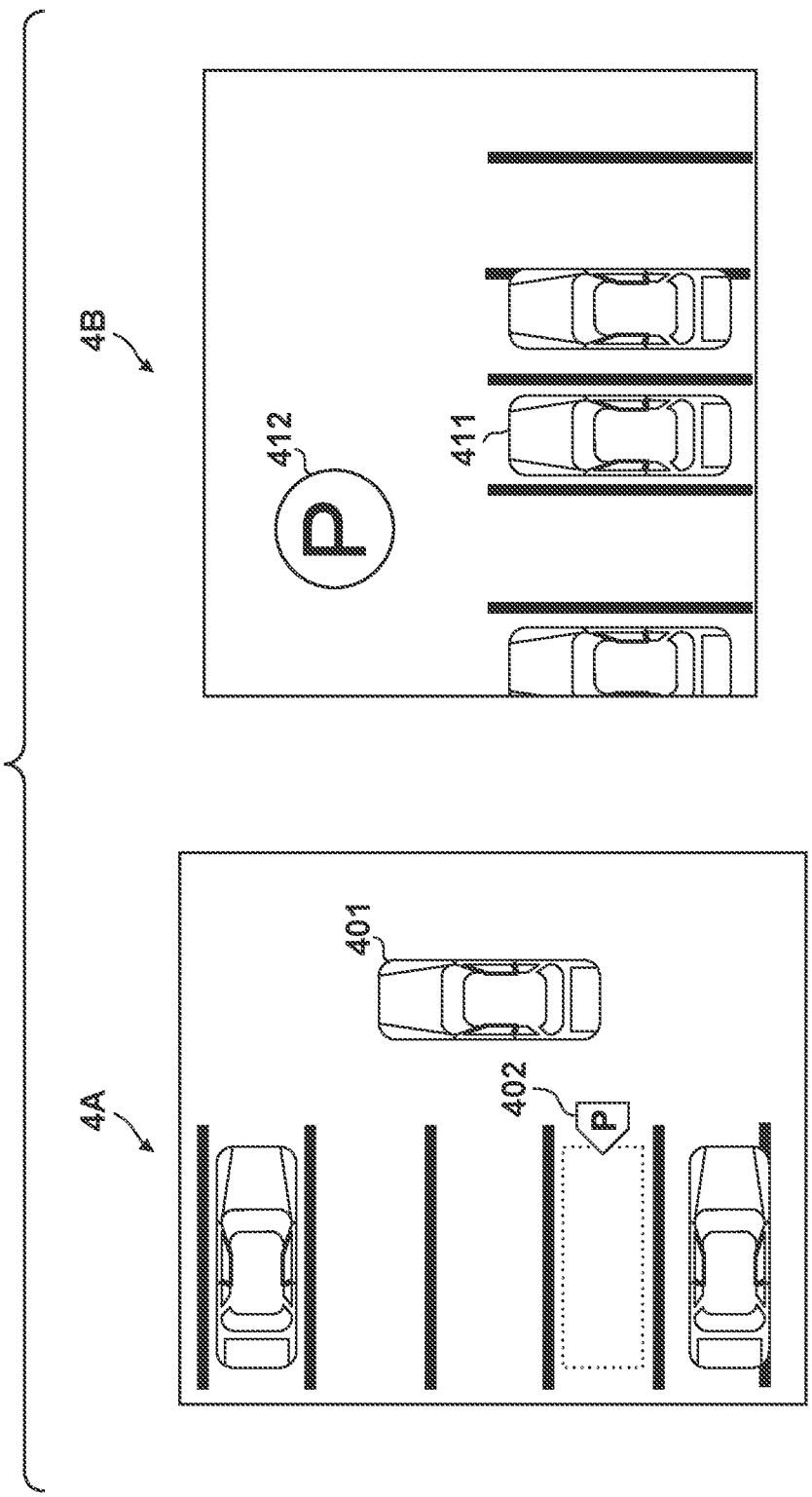
FIG. 4 is a view showing examples of the display screen during parking space entry control according to the embodiment of the present invention.

FIG. 4 shows examples of an image to be displayed in the area 205 of the touch panel display shown in FIG. 2 when parking support control is executed. A state in which the user has operated the touch panel display to designate the parking space 313 in the state shown in the example 3B of FIG. 3 is shown here. In an example 4A of FIG. 4, a self-vehicle 401 and an icon 402 indicating a target position for the parking space entry operation are displayed, in the area 205 of the touch panel display, as the state immediately before the start of the parking support operation. In an example 4B of FIG. 4, a self-vehicle 411 and an icon 412 indicating the completion of the parking space entry operation are displayed, in the area 205 of the touch panel display, as the state in which the parking support operation has been completed.

Figure 5:
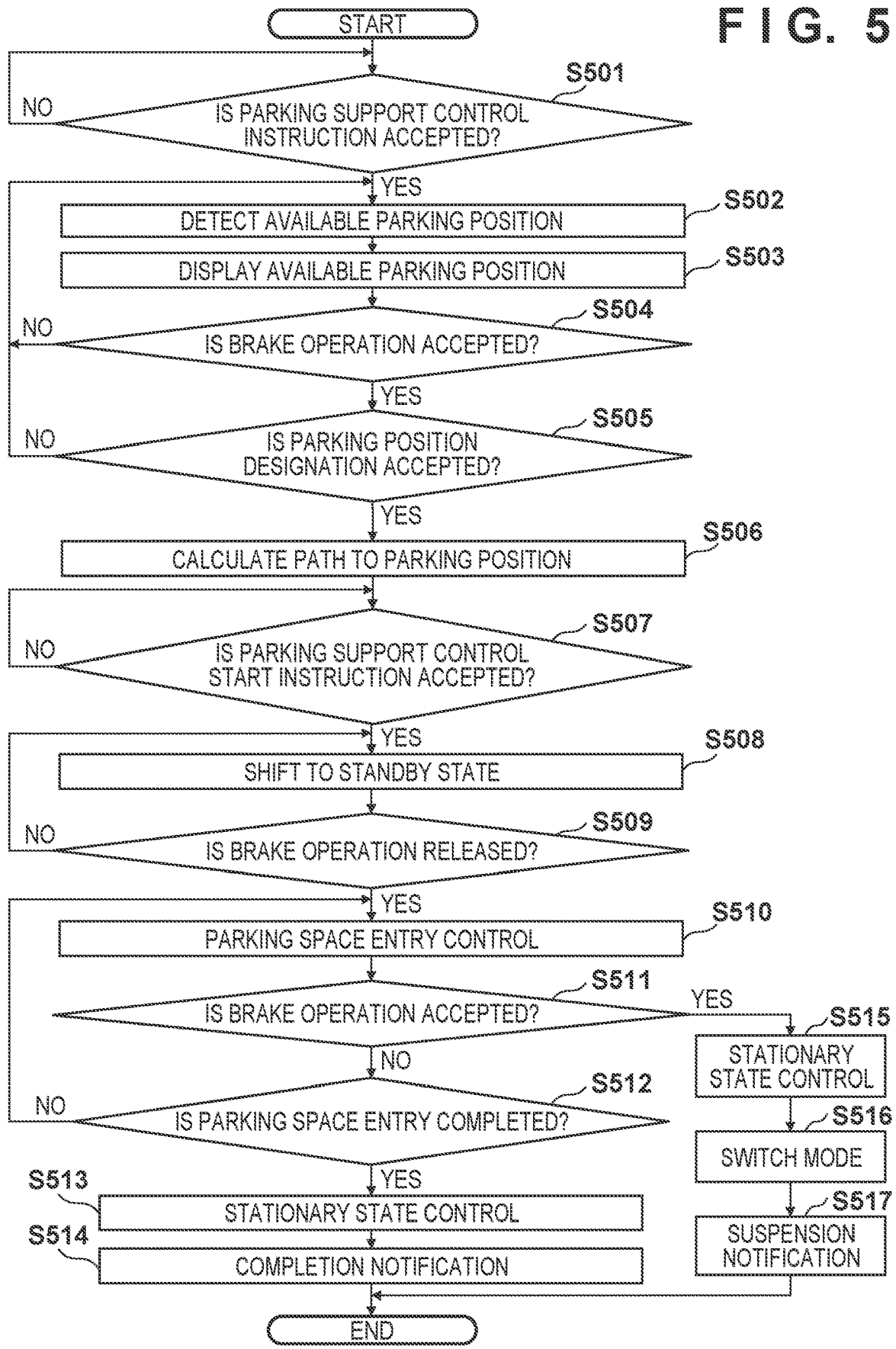
FIG. 5 is a flowchart of processing performed during the parking space entry control according to the embodiment of the present invention.

FIG. 5 is a flowchart of parking space entry processing of the parking support control according to this embodiment. Assume that the procedure of this processing is performed in cooperation by, for example, the ECUs included in the vehicle 1, and the control system 2 which functions as the parking support system will be generally indicated as the processing subject.

In step S501, the control system 2 determines whether a parking support control instruction has been accepted. In this embodiment, assume that a parking support control instruction is issued when the button 204, as shown in FIG. 2, is pressed. Note that a parking support control instruction can be issued by pressing the switches forming the input device 93 as described above. If the parking support control instruction has been accepted (YES in step S501), the process advances to step S502. If the parking support control instruction has not been accepted (NO in step S501), the control system will wait until an instruction is accepted. At this time, the control system 2 may execute another control operation which is different from the parking support control.

In step S502, the control system 2 detects, based on the detection result obtained by the detection units 41 to 43, each available parking space where the self-vehicle can be parked in the periphery of the vehicle 1. At this time, the vehicle 1 may be stationary or may be traveling in a low speed which is equal to or less than a predetermined speed.

In step S503, the control system 2 displays, in the area 205 of the touch panel display, each available parking space detected in step S502. For example, each available parking space can be clearly indicated by dotted lines or the like in the manner shown in FIG. 3. The display method is not particularly limited in this case. In addition, the control system 2 can also display, in the area 201 or the area 203 of the touch panel display, a message to notify the driver of the detection of an available parking space.

In step S504, the control system 2 determines whether a brake operation performed by the user (driver) has been accepted. At this time, control may be performed so as not to accept the selection of an available parking space on the touch panel display until a brake operation has been accepted. If the brake operation has been accepted (YES in step S504), the process advances to step S505. If the brake operation has not been accepted (NO in step S504), the process returns to step S502 and the processing is repeated.

In step S505, the control system 2 determines whether a parking position has been selected from the available parking spaces that are displayed on the touch panel display. If a selection has been accepted (YES in step S505), the process advances to step S506. If a selection has not been accepted (NO in step S505), the process returns to step S502 and the processing is repeated.

In step S506, the control system 2 calculates a path to the parking position from the selected parking position, the current position of the self-vehicle, the positions of peripheral target objects, and the like, At this time, the path information may be displayed on the touch panel display.

In step S507, the control system 2 determines whether a parking support control start instruction has been accepted. In this embodiment, assume that a parking support control start instruction is issued when a button (not shown) displayed on the touch panel display is pressed in a manner similar to the pressing of the button 204. Note that the parking support control start instruction may be issued by pressing the switches forming the input device 93. If the parking support control start instruction has been accepted (YES in step S507), the process advances to step S508. If the parking support control start instruction has not been accepted (NO in step S507), the control system waits until an instruction is accepted.

In step S508, the control system 2 shifts to a standby state in which the parking support control can be started. At this time, display as shown in the example 4A of FIG. 4 is performed. In addition, the control system 2 can also display, in the area 201 or the area 203 of the touch panel display, a message to prompt the driver to release the brake operation in order to start the parking support control. The brake operation in this case corresponds to an operation on the brake pedal 7B.

In step S509, the control system 2 determines whether the brake operation has been released. If the brake operation has been released (YES in step S509), the process advances to step S510. If the brake operation has not been released (NO in step S509), the process returns to step S508 and the standby state is continued.

In step S510, the control system 2 executes the parking space entry control based on the path information calculated in step S506.

In step S511, the control system 2 determines whether the user (driver) has made a brake operation during the execution of the parking space entry control. The brake operation here corresponds to an operation performed by the driver to suspend the automatic parking operation upon recognizing some kind of target object in accordance with changes in the peripheral environment. The operation amount of the brake operation here may be held in advance, and it may be determined that an instruction to suspend the automatic parking operation has been issued in a case in which an operation equal to or more than this operation amount has been performed. If the brake operation has been accepted (YES in step S511), the process advances to step S515. If the brake operation has not been accepted (NO in step S511), the process advances to step S512.

In step S512, the control system 2 determines whether the parking space entry control has been completed. That is, the control system determines whether the vehicle 1 has reached the parking position designated in step S505. If the parking space entry control has been completed (YES in step S512), the process advances to step S513. If the parking space entry control has not been completed (NO in step S512), the process returns to step S510 and the parking space entry control is continued.

In step S513, the control system 2 performs stationary state control. In this embodiment, in this stationary state control, braking by the parking lock mechanism by changing the gear shift position to the park range is performed in addition to the braking by the brake device 10.

In step S514, the control system 2 notifies the driver by displaying a message indicating the completion of the parking support control in the area 201 or the area 203 on the touch panel display. For example, display is performed in the manner shown in the example 4B of FIG. 4. Note that the notification method may be executed by voice or the like. Subsequently, the procedure of this processing ends.

In step S515, the control system 2 executes stationary state maintenance control of the vehicle 1. The stationary state control here will be performed based on the brake operation performed by the user. The gear shift position is not changed in this case.

In step S516, the control system 2 switches the mode. In this case, the control system switches the current mode from the parking support control mode to a manual driving mode.

In step S517, the control system 2 notifies the driver by displaying a message indicating the suspension of the parking support control in the area 201 or the area 203 on the touch panel display. Note that the notification method may be executed by voice or the like. It may be arranged so that an operation to confirm whether parking support control is to be restarted will be performed and the parking support control will be restarted in accordance with the confirmation result. Subsequently, the procedure of this processing ends.

[Parking Space Exit Control]

Figure 6:
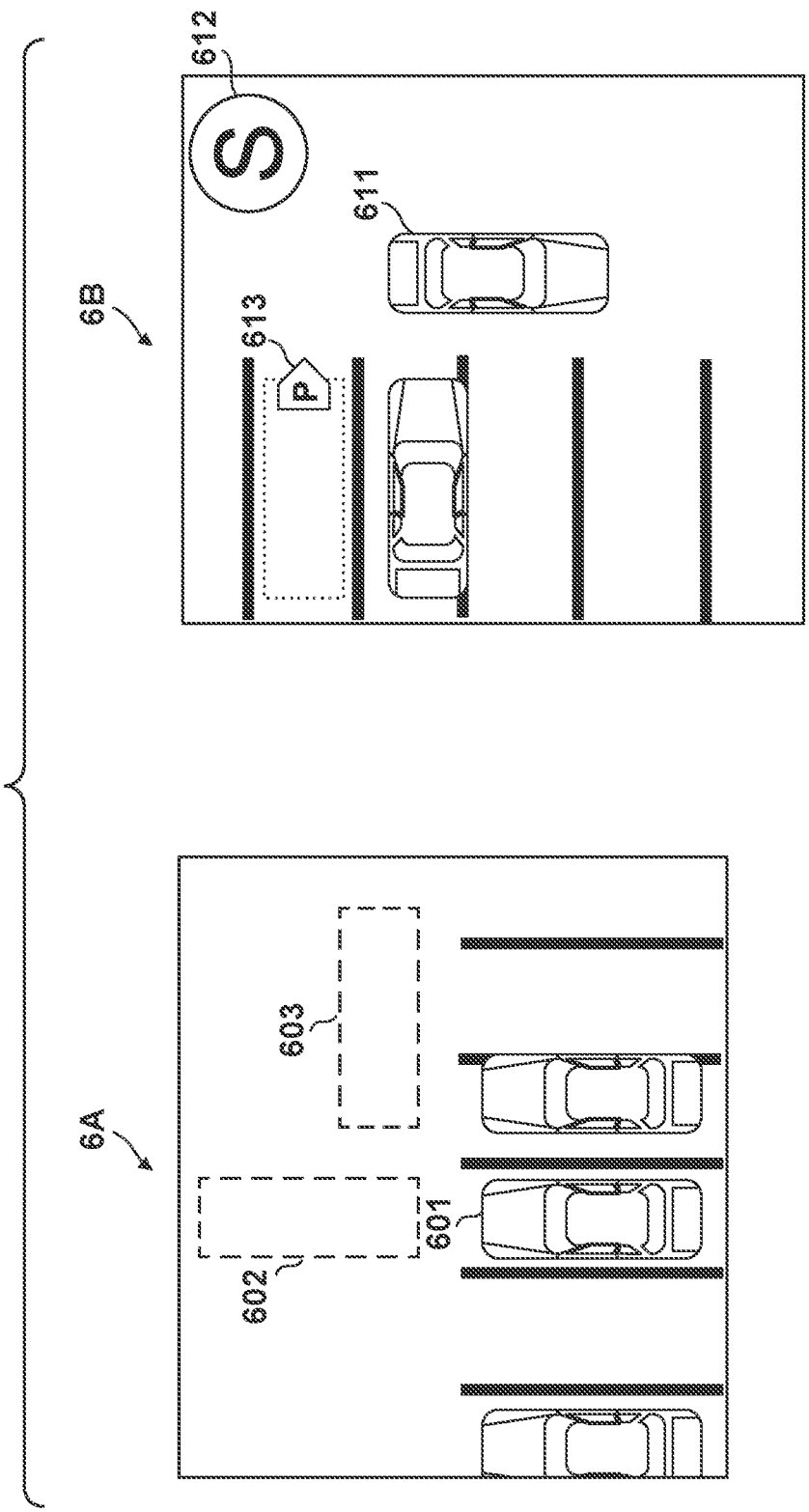
FIG. 6 is a view showing examples of the display screen during parking space exit control.

FIG. 6 shows examples of an image displayed in the area 205 of the touch panel display shown in FIG. 2 when the parking space exit control of the parking support control according to this embodiment is performed. An example 6A of FIG. 6 shows a state in which parking space exit areas 602 and 603 to which the vehicle can exit from the parking space have been detected in the peripheral area based on the detection result by the detection units 41 to 43 when a vehicle 601 is parked in a parking lot or the like. An example 6B of FIG. 6 shows a state in which the parking space exit area 603 of the example 6A of FIG. 6 has been designated and the parking space exit control of a vehicle 611 has been completed. An icon 612 which indicates the completion of the parking space exit control is displayed. In addition, an icon 613 is displayed in the space where the vehicle 611 was positioned immediately before the start of the parking space exit control. Note that although an example in which the vehicle performs the parking space exit operation by traveling forward is shown here, assume that a similar process will be performed in a case in which the vehicle is to perform the parking space exit operation by traveling in reverse.

Figure 7:
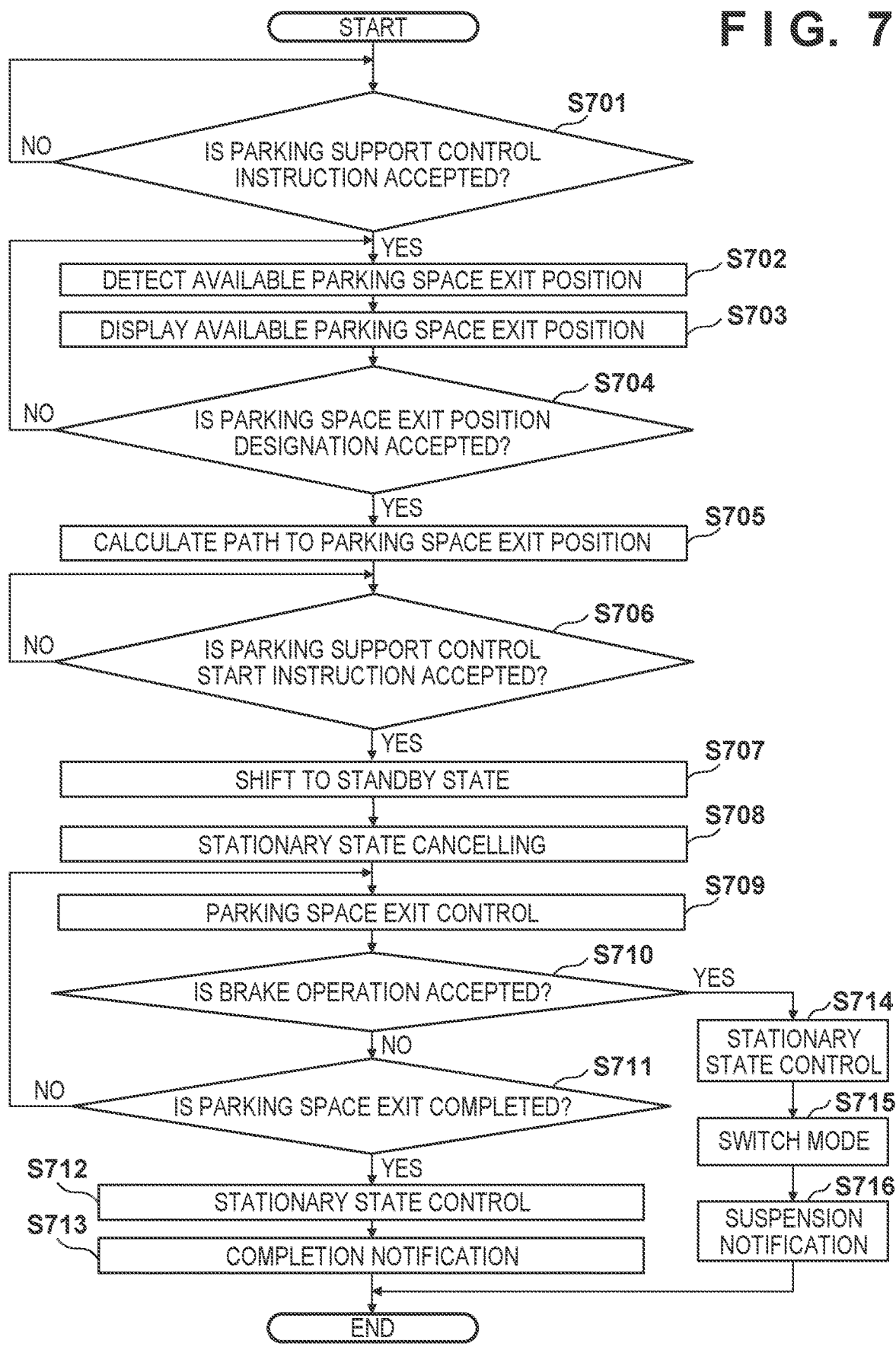
FIG. 7 is a flowchart of processing performed during the parking space exit control.

FIG. 7 is a flowchart of the parking space exit control of the parking support control according to this embodiment. Assume that the procedure of this processing is performed in cooperation by, for example, the ECUs included in the vehicle 1, and the control system 2 which functions as the parking support system will be generally indicated as the processing subject.

In step S701, the control system 2 determines whether a parking support control instruction has been accepted. In this embodiment, assume that a parking support control instruction is issued when the button 204, as shown in FIG. 2, is pressed. Note that a parking support control instruction can be issued by pressing the switches forming the input device 93 as described above. If the parking support control instruction has been accepted (YES in step S701), the process advances to step S702. If the parking support control instruction has not been accepted (NO in step S701), the control system will wait until an instruction is accepted. At this time, the control system 2 may execute another control operation which is different from the parking support control.

In step S702, the control system 2 detects, based on the detection result obtained by the detection units 41 to 43, each area to which the self-vehicle can exit from the parking space in the periphery of the vehicle 1. At this time, the control system 2 can detect an available parking space exit area from one of an area to which the self-vehicle can exit by advancing straight, an area to which the self-vehicle can exit by making a left turn, and an area to which the self-vehicle can exit by making a right turn.

In step S703, the control system 2 displays, in the area 205 of the touch panel display, each available parking space exit area detected in step S702. For example, each available parking space exit area can be clearly indicated by dotted lines as shown in the example 6A of FIG. 6. The display method here is not particularly limited. For example, directions (forward, right turn, and left turn) in which the vehicle can exit from the parking space may be simply displayed in a selectable manner. In addition, the control system 2 may also display a message in the area 201 or the area 203 to notify the driver of the parking space exit area.

In step S704, the control system 2 determines whether a parking space exit position has been selected among the available parking space exit areas displayed on the touch panel display. If a selection has been accepted (YES in step S704), the process advances to step S705. If a selection has not been accepted (No in step S704), the process returns to step S702 and the processing is repeated.

In step S705, the control system 2 calculates a path to the parking space exit position from the selected parking space exit position, the current position of the self-vehicle, the positions of peripheral target objects, and the like. At this time, the path information may be displayed on the touch panel display.

In step S706, the control system 2 determines whether a parking support control start instruction has been accepted. In this embodiment, assume that a parking support control start instruction is issued when a button (not shown) displayed on the touch panel display is pressed in a manner similar to the pressing of the button 204. Note that the parking support control start instruction may be issued by pressing the switches forming the input device 93. If the parking support control start instruction has been accepted (YES in step S706), the process advances to step S707. If the parking support control start instruction has not been accepted (NO in step S706), the control system waits until an instruction is accepted.

In step S707, the control system 2 shifts to a standby state in which the parking support control can be started. In addition, the control system 2 may also display, in the area 201 or the area 203, a message indicating that the parking support control will be started.

In step S708, the control system 2 cancels the stationary state. For example, the control system 2 switches the range of the gear shift position and releases the brake.

In step S709, the control system 2 executes the parking space exit control based on the path information calculated in step S705.

In step S710, the control system 2 determines whether the user (driver) has made a brake operation during the execution of the parking space exit control. The brake operation here corresponds to an operation performed by the driver to suspend the automatic parking space exiting operation upon recognizing some kind of target object in accordance with changes in the peripheral environment. The operation amount of the brake operation here may be held in advance, and it may be determined that an instruction to suspend the automatic parking operation has been issued in a case in which an operation equal to or more than this operation amount has been performed. If the brake operation has been accepted (YES in step S710), the process advances to step S714. If the brake operation has not been accepted (NO in step S710), the process advances to step S711.

In step S711, the control system 2 determines whether the parking space exit control has been completed. That is, the control system determines whether the vehicle 1 has reached the parking space exit position designated in step S704. If the parking space exit control has been completed (YES in step S711), the process advances to step S712. If the parking space exit control has not been completed (NO in step S711), the process returns to step S709 and the parking space exit control is continued.

In step S712, the control system 2 performs stationary state control. In this embodiment, braking by the brake device 10 is performed in this stationary state control. Note that the parking space exit control differs from the parking space entry control in that an operation to change the gear shift position to the park range is not performed. That is, the stationary state of the vehicle is maintained by only an operation on the brake device 10.

In step S713, the control system 2 displays, in the area 201 or the area 203 on the touch panel display, a message indicating the completion of the parking space exit control. For example, display as shown in the example 6B of FIG. 6 will be performed. Note that the notification method may be executed by voice or the like. Subsequently, the procedure of this processing ends.

In step S714, the control system 2 performs the stationary state control of the vehicle 1. The stationary state control here will be performed based on the brake operation by the user.

In step S715, the control system 2 switches the mode. In this case, the control system switches the current mode from the parking support control mode to the manual driving mode.

In step S716, the control system 2 notifies the driver by displaying, in the area 201 or the area 203 on the touch panel display, a message indicating the suspension of the parking space exit control. Note that the notification method may be executed by voice or the like. It may be arranged so that an operation to confirm whether the parking space exit control is to be restarted will be performed and the parking space exit control will be restarted in accordance with the confirmation result. Subsequently, the procedure of this processing ends.

As described above, the brake control set at the completion of a parking space entry operation and the brake control set at the completion of a parking space exit operation are switched in the parking support control. That is, brake control is performed in the stationary state of the vehicle at the completion of the parking support control operation by taking into account the subsequent operation to be performed by the driver. More specifically, at the completion of the parking space entry operation, the gear shift position will be set to the park range in the stationary state based on the assumption that the user will get out of the vehicle. On the other hand, at the completion of the parking space exit operation, the gear shift position will not be set to the park range in the stationary state based on the assumption that the driving operation of the vehicle will be handed over to the user. Note that at the completion of the parking space exit operation, the gear shift position can be set to, for example, the drive range.

Note that it may be arranged so that the parking support control will be suspended if a predetermined condition is satisfied until a parking support control start instruction is accepted after the acceptance of a parking support control instruction. The predetermined condition in this case may be, for example, a case in which a start instruction has not been accepted even after a predetermined time has elapsed, a case in which the speed of the self-vehicle is a predetermined speed or higher, or the like.

[Braking Release Control]

In this embodiment, the vehicle 1 is maintained in a stationary state at the completion of the parking space entry operation and at the completion of the parking space exit operation based on the parking support control described above (step S513 of FIG. 5 and step S712 of FIG. 7), Braking release control that is performed in this stationary state will be described next.

As described above, at the completion of the parking space entry operation, the vehicle is maintained in a stationary state by the braking by the brake device 10 and the parking lock mechanism of the park range. In this state, the control system 2 will release the braking by the brake device 10 over a predetermined time. For example, the liquid pressure (oil pressure) used for brake control can be decreased at a predetermined ratio. Assume that although the time required for this releasing operation and the reduction ratio of the braking force are not particularly limited, they are predetermined. That is, the braking release control at the completion of the parking space entry operation will be performed regardless of the operation performed by the driver.

On the other hand, at the completion of the parking space exit operation, the vehicle is maintained in a stationary state by the braking by the brake device 10. In this state, in response to detecting that the driver has made a brake operation on the brake pedal 7B, the control system 2 will release the braking force of the brake device 10 over a predetermined time. Here, letting a first time be a time required to release the braking by the brake device 10 at the completion of the parking space entry operation and a second time be a time required to release the braking by the brake device 10 at the completion of the parking space exit operation, it will be set so that (first time)>(second time)

Note that the liquid pressure to be used for brake control can be decreased at a predetermined ration also in a case in which the braking by the brake device 10 is to be released at the time of the parking space exit operation. That is, the braking release control at the completion of the parking space exit operation is performed in response to an operation performed by the driver.

As described above, suppressing the vehicle body from swinging back due to the switching of the brake mechanism in the internal structure of the vehicle can be given as a reason for setting a long period of time for the braking release performed at the time of the parking space entry operation. Also, by performing braking release earlier at the time of the parking space exit operation, the operation subject can be handed over smoothly from the system to the driver.

In addition, as another arrangement of braking release control, the braking release control may be started in response to the switching of the range or the operation of the parking brake instead of the operation of the brake pedal 7B by the driver. For example, the braking release control may be started in response to the driver switching the range of the gear shift position to the park range after the completion of the parking space exit operation. Alternatively, the braking release control may be started in response to the driver operating the parking brake after the completion of the parking space exit operation.

As described above, according to this embodiment, in a case in which the control subject is to be switched from the side of the system to the driver at the completion of the parking support control, the control subject can be appropriately handed over from the side of the system to the driver.

Summary of Embodiment

1. A parking support system according to the above-described embodiment is a parking support system (for example, 2) of a vehicle (for example, 1), comprising:
a detection unit (for example, 41-43) configured to detect information of a periphery of the vehicle;
a control unit (for example, 2) configured to control, based on the information detected by the detection unit, a parking space entry operation of the vehicle to a parking space and a parking space exit operation of the vehicle from the parking space; and
a stationary state control unit (for example, 2, 10) configured to maintain a stationary state of the vehicle after one of the parking space entry operation and the parking space exit operation has been completed,
wherein the stationary state control unit maintains the stationary state by first maintenance control when the parking space entry operation has been completed, and
maintains the stationary state by second maintenance control, which is different from the first maintenance control, when the parking space exit operation has been completed.

According to this embodiment, in a case in which the control subject is to be switched from the side of the system to the driver upon completion of parking support control, the control subject can be appropriately handed over from the side of the system to the driver, in particular, the state of the vehicle can be shifted to a stationary state that takes into consideration the labor of the driver's operation based on a subsequent action to be taken by the driver.

2. In the above-described embodiment, the first maintenance control is control to maintain the stationary state by brake control and setting a gear shift position in the park range, and
the second maintenance control is control to maintain the stationary state by the brake control.

According to this embodiment, the state of the vehicle can be shifted to a stationary state that takes into consideration the labor of the driver's operation based on a subsequent action to be taken by the driver.

3. In the above-described embodiment, the first maintenance control is control to maintain the stationary state by brake control, setting a gear shifter in a park range, and using a parking brake, and
the second maintenance control is control to maintain the stationary state by the brake control.

According to this embodiment, the state of the vehicle can be shifted to a stationary state that takes into consideration the labor of the driver's operation based on a subsequent action to be taken by the driver.

4. In the above-described embodiment, the stationary state control unit releases a braking force of the brake control by decreasing the braking force of the brake control over a first period of time from the start of the maintenance of the stationary state after the parking space entry operation has been completed, and in a case in which the stationary state is being maintained after the parking space exit operation has been completed, the stationary state control unit releases a braking force of the brake control by decreasing the braking force of the brake control over a second period of time, which is shorter than the first period of time, after a predetermined operation by a driver of the vehicle has been accepted.

According to this embodiment, in a case in which the control subject is to be switched from the side of the system to the driver upon completion of parking support control, the control subject can be appropriately handed over from the side of the system to the driver. In addition, it is possible to suppress the influence of the swing back of the vehicle body.

5. In the above-described embodiment, a reduction ratio of the braking force of the brake control is predetermined.

According to this embodiment, the maintenance of the stationary state can be appropriately canceled.

6. In the above-described embodiment, the predetermined operation is an operation performed on a brake pedal to perform the brake control.

According to this embodiment, the operation subject can be appropriately handed over in response to an operation by the driver.

7. In the above-described embodiment, the predetermined operation is an operation related to changing a range of a gear shift position.

According to this embodiment, the operation subject can be appropriately handed over in response to an operation by the driver.

8. In the above-described embodiment e predetermined operation is an operation performed on a parking brake.

According to this of embodiment, the operation subject can be appropriately handed over in response to an operation by the driver.

9. A control method of a parking support system according to the above-described embodiment is a control method of parking support system (for example, 2) of a vehicle (for example, 1), the method comprising:
 a detection step of detecting information of a periphery of the vehicle;
 a control step of controlling, based on the information detected in the detection step, a parking space entry operation of the vehicle to a parking space and a parking space exit operation of the vehicle from the parking space; and
 a stationary state control step of maintaining a stationary state of the vehicle after one of the parking space entry operation and the parking space exit operation has been completed,
 wherein in the stationary state control step, the stationary state is maintained by first maintenance control when the parking space entry operation has been completed, and the stationary state is maintained by second maintenance control, which is different from the first maintenance control, when the parking space exit operation has been completed.

According to this embodiment, in a case in which the control subject is to be switched from the side of the system to the driver upon completion of parking support control, the control subject can be appropriately handed over from the side of the system to the driver. In particular, the state of the vehicle can be shifted to a stationary state that takes into consideration the labor of the driver's operation based on a subsequent action to be taken by the driver.

The invention is not limited to the foregoing embodiments, and various variations/changes are possible within the spirit of the invention.

What is claimed is:

1. A parking support system of a vehicle, comprising:
 a detection unit configured to detect information of a periphery of the vehicle;
 a control unit configured to control, based on the information detected by the detection unit, a parking space entry operation of the vehicle to a parking space and a parking space exit operation of the vehicle from the parking space; and
 a stationary state control unit configured to maintain a stationary state of the vehicle after one of the parking space entry operation and the parking space exit operation has been completed,
 wherein the stationary state control unit maintains the stationary state by first maintenance control when the parking space entry operation has been completed, and maintains the stationary state by second maintenance control, which is different from the first maintenance control, when the parking space exit operation has been completed, and
 wherein the stationary state control unit releases a braking force of brake control by decreasing the braking force of the brake control over a first period of time from the start of the maintenance of the stationary state after the parking space entry operation has been completed,
 in a case in which the stationary state is being maintained after the parking space exit operation has been completed, the stationary state control unit releases a braking force of the brake control by decreasing the braking force of the brake control over a second period of time, which is shorter than the first period of time, after a predetermined operation by a driver of the vehicle has been accepted,
 in a state where the parking space entry operation is completed, after the vehicle is maintained in the stationary state by the braking by a brake device, the vehicle is maintained in the stationary state by the braking by a parking lock mechanism of a park range, the stationary state control unit releases the braking by the brake device over the first period of time, regardless of an operation performed by the driver, and
 in a state where the parking space exit operation is completed, the vehicle is maintained in the stationary state by the braking by the brake device, in response to detecting a brake operation on a brake pedal by the driver, the stationary state control unit releases the braking force of the brake device over the second period of time.

2. The system according to claim 1, wherein
 the first maintenance control is control to maintain the stationary state by the brake control and setting a gear shift position in the park range, and
 the second maintenance control is control to maintain the stationary state by the brake control.

3. The system according to claim 1, wherein
 the first maintenance control is control to maintain the stationary state by brake control, setting a gear shifter in the park range, and using a parking brake, and
 the second maintenance control is control to maintain the stationary state by the brake control.

4. The system according to claim 1, wherein a reduction ratio of the braking force of the brake control is predetermined.

5. The system according to claim 4, wherein the predetermined operation is the operation performed on a brake pedal to perform the brake control.

6. The system according to claim 1, wherein the predetermined operation is an operation related to changing a range of a gear shift position.

7. The system according to claim 1, wherein the predetermined operation is the operation performed on a parking brake.

8. A control method of parking support system of a vehicle, the method comprising:
 a detection step of detecting information of a periphery of the vehicle;
 a control step of controlling, based on the information detected in the detection step, a parking space entry operation of the vehicle to a parking space and a parking space exit operation of the vehicle from the parking space; and
 a stationary state control step of maintaining a stationary state of the vehicle after one of the parking space entry operation and the parking space exit operation has been completed,
 wherein in the stationary state control step, the stationary state is maintained by first maintenance control when the parking space entry operation has been completed, and the stationary state is maintained by second maintenance control, which is different from the first maintenance control, when the parking space exit operation has been completed, and wherein the stationary state control step releases a braking force of brake control by decreasing the braking force of the brake control over a first period of time from the start of the maintenance of the stationary state after the parking space entry operation has been completed, in a case in which the stationary state is being maintained after the parking space exit operation has been completed, the stationary state control step releases a braking force of the brake control by decreasing the braking force of the brake control over a second period of time, which is shorter than the first period of time, after a predetermined operation by a driver of the vehicle has been accepted, in a state where the parking space entry operation is completed, after the vehicle is maintained in the stationary state by the braking by a brake device, the vehicle is maintained in the stationary state by the braking by a parking lock mechanism of a park range, the stationary state control step releases the braking by the brake device over the first period of time, regardless of an operation performed by the driver, and in a state where the parking space exit operation is completed, the vehicle is maintained in the stationary state by the braking by the brake device, in response to detecting a brake operation on a brake pedal by the driver, the stationary state control step releases the braking force of the brake device over the second period of time.

9. A parking support system of a vehicle, comprising:

a detection unit configured to detect information of a periphery of the vehicle;

a control unit configured to control, based on the information detected by the detection unit, a parking space entry operation of the vehicle to a parking space and a parking space exit operation of the vehicle from the parking space; and a stationary state control unit configured to maintain a stationary state of the vehicle after one of the parking space entry operation and the parking space exit operation has been completed, wherein the stationary state control unit notifies a user of a completion of the parking space entry operation when the vehicle has reached a parking space selected by the user among available parking spaces detected by the detection unit, and maintains the stationary state by first maintenance control when the parking space entry operation has been completed, and notifies the user of a completion of the parking space exit operation when the vehicle has reached a parking space exit position selected by the user among available parking space exit areas detected by the detection unit, and maintains the stationary state by second maintenance control, which is different from the first maintenance control, when the parking space exit operation has been completed, the stationary state control unit causes a screen to display a position of the vehicle after the completion of the parking space entry operation and an icon indicating the completion of the parking space entry operation, in order to notify the user of the completion of the parking space entry operation, and causes the screen to display a position of the vehicle after the completion of the parking space exit operation, an icon indicating a space where the vehicle was positioned before a start of the parking space exit operation and an icon indicating the completion of the parking space exit operation, in order to notify the user of the completion of the parking space exit operation, in a state where the parking space entry operation is completed, after the vehicle is maintained in the stationary state by the braking by a brake device, the vehicle is maintained in the stationary state by the braking by a parking lock mechanism of a park range, the stationary state control unit releases the braking by the brake device over the first period of time, regardless of an operation performed by the driver, and in a state where the parking space exit operation is completed, the vehicle is maintained in the stationary state by the braking by the brake device, in response to detecting a brake operation on a brake pedal by the user, the stationary state control unit releases the braking force of the brake device over a second period of time, which is shorter than the first period of time.

10. The system according to claim 1, wherein the vehicle includes, as a mechanism for the braking, the brake device and the parking lock mechanism included in a transmission, the parking lock mechanism is a braking mechanism that operates when the transmission has been switched to a park range, and provides a constant braking force, the brake device is provided for each wheel of the vehicle and stops the vehicle by applying a resistance to the rotation of the wheel, in a state where the parking space entry operation is completed, a gear shift position is switched to the park range, after the vehicle is maintained in the stationary state by the braking by the brake device, the vehicle is maintained in the stationary state by the braking by the parking lock mechanism of the park range, and the brake device releases the resistance applied to the wheel over the first period of time.

* * * * *